No. 755,519. Patented March 22, 1904.

UNITED STATES PATENT OFFICE.

GEORGE T. MOORE, OF WASHINGTON, DISTRICT OF COLUMBIA.

PROCESS OF PREPARING FOR DISTRIBUTION ORGANISMS WHICH FIX ATMOSPHERIC NITROGEN.

SPECIFICATION forming part of Letters Patent No. 755,519, dated March 22, 1904.

Application filed May 4, 1903. Serial No. 155,695. (No specimens.)

*To all whom it may concern:*

Be it known that I, GEORGE T. MOORE, a citizen of the United States, residing at Washington, in the District of Columbia, have invented new and useful Improvements in the Process of Preparing for Distribution Organisms which Fix or Gather Atmospheric Nitrogen, of which the following is a specification.

This application is made under the act of March 3, 1883, chapter 143, and the invention herein described and claimed, if patented, may be used by the Government of the United States or any of its officers or employees in prosecution of work for the Government or by any other person in the United States without the payment to me of any royalty thereon.

The invention relates to the process of growing these organisms and preparing them for distribution.

The invention has for its object the production of more highly effective organisms and their distribution in a form preventing deterioration and easily applied in agriculture. All work that has heretofore been done in the cultivation of nitrogen-gathering root-tubercle organisms for use in agriculture has been done in culture media containing either decoctions of the leguminous plants, from which these specific organisms in each case were obtained, or in media containing some other available form of combined nitrogen not free or atmospheric. When there is available combined nitrogen in the medium, the organisms instead of depending solely upon the atmospheric nitrogen for their nitrogen-supply draw upon the nitrogenous materials of the culture medium—such, for example, as proteids, nitrates, ammonium compounds, &c.—for which reason they do not develop their full nitrogen-gathering power and rapidly deteriorate.

By my process the organisms are first obtained from the tubercles or swellings on the roots of the leguminous plants — such as clovers, cow-peas, beans, &c. After the tubercles are thoroughly washed and surface sterilized in the ordinary ways the interior of the tubercle is cut out under sterile conditions and mixed in a medium consisting of water containing about one per cent. commercial agar-agar, about one per cent. maltose sugar or cane-sugar, (the former being the better,) about .02 to .05 per cent. magnesium sulfate, and about 0.1 per cent. monobasic potassium phosphate. This solution is made up in the ordinary way and sterilized according to ordinary bacteriological processes. It differs from ordinary culture media for bacteria only in the absence of a source of combined nitrogen. The agar may be varied above or below the amount suggested. The maltose or cane-sugar may be increased to ten per cent., the magnesium sulfate to one per cent., the monobasic potassium phosphate to two per cent., or the amounts may be lowered below the quantities first mentioned. In the latter case, however, the food materials are more quickly used up. The organism multiplies as long as the materials in solution are not exhausted. Other compounds may be used as sources of magnesium, potassium, and phosphoric acid. Although I usually leave nitrogen out of the culture medium at this stage, its absence is not essential, as the object of the first step is simply to separate the organisms into pure cultures free from mold or other contamination, the process of separating out in this fashion being familiar to all bacteriologists and in common use. They grow best between 20° and 30° centigrade, and light or its absence is immaterial. When pure cultures are thus obtained, the organism is transferred immediately, or after several weeks, if desired, by any of the bacteriological transfer methods in use to water containing about one per cent. cane-sugar or maltose, (the latter being the better,) about .02 to .05 per cent. magnesium sulfate, and about 0.1 per cent. monobasic potassium phosphate, or equivalent sources of magnesium, potassium, and phosphorus, as in the case of the first-described medium. The quantities used may here also vary, as stated above; but the per cents. given have been found to be the most favorable for growth under ordinary conditions. One cubic centimeter of the culture will suffice for impregnating one hundred liters of the fluid. Any kind of container or vessel that can be easily cleaned will serve for this purpose; but Erlenmeyer flasks are best where small quantities are to be cultivated under antiseptic conditions. In this solution, which should be kept between 20° and 30° centigrade, in light or in darkness, as desired, the organisms increase very rapidly and have to obtain all of their nitrogen in the free state from the atmosphere or from the atmospheric nitrogen in solution in the medium. This liquid culture solution, even when in large quantity, will in a few days become milky in appearance by the presence of immense numbers of the developing organisms. The water containing the organisms, where direct use is desired, is then sprinkled upon seeds or soil; but for the purposes of preservation and distribution the following steps are taken: Absorbent cotton or other equivalent material is dipped into the water containing the organisms or the water containing the organisms is sprinkled upon the cotton or other material and the same thoroughly air-dried in a chamber free from dust or contamination by molds. The drying is facilitated by forcing a current of air through the chamber by aspiration through sulfuric acid, potassium hydroxid, calcium hydroxid, sodium hydroxid, or any of the other ordinary materials used in laboratories for drying. In this dry form the organisms may be kept indefinitely without deterioration or change and may be safely, easily, and cheaply transported to any distance, either through the mails or otherwise. In using the organisms preserved as above described the dry absorbent material containing them is simply dropped into a water solution of the same composition as above described. Where the purpose is to treat soil or seed, it is not necessary to observe strictly antiseptic precautions. Ordinary clean vessels or tubs may be used, simply protected from dust, and ordinary well-water or rain-water is used in making the culture solution, as the amount of nitrates or ammonia which such waters ordinarily contain does not interfere with the vitality of the organisms at this stage of the process. The temperature and light conditions should be as previously stated. In from twelve to forty-eight hours the organisms will have increased in the water culture as in the first instance. At this stage in order to stimulate a very rapid division of the bacteria about one per cent. phosphate of ammonia is added to the culture solution. The quantity of liquid culture that may be thus obtained is limited only by the amount of water used containing the sugar, magnesium sulfate, and potassium phosphate or other equivalent sources of magnesium, potassium, and phosphorus, as above described. After thus obtaining the liquid culture it is then necessary only to sprinkle the seeds or soil to be treated with water containing the organisms or to dip the seeds into water containing the organisms and then dry them in the ordinary way to facilitate planting. The propagation of the bateria should not be continued longer than twelve to forty-eight hours after the addition of the phosphate of ammonia; otherwise they will deteriorate in nitrogen-fixing power, as previously explained, and organisms thus stimulated should be used only for seed or soil impregnation and not for preservation or distribution.

Having thus described my invention, what I claim, and desire to secure by Letters Patent, is—

The process of preparing for distribution nitrogen-gathering organisms, which consists in moistening suitable absorbent material with a solution in which such organisms are suspended, and afterward thoroughly drying the said material substantially as hereinbefore described.

In testimony whereof I have signed my name to this specification in the presence of two subscribing witnesses.

GEORGE T. MOORE.

Witnesses:
 A. F. WOODS,
 GEO. P. MCCABE.